July 10, 1962 W. J. ORLIN 3,043,102
INLETS
Filed Aug. 1, 1952

INVENTOR
WILLIAM J. ORLIN
BY
ATTORNEY

3,043,102
INLETS
William J. Orlin, St. Louis, Mo., assignor to the United States of America as represented by the Secretary of the Navy
Filed Aug. 1, 1952, Ser. No. 302,090
4 Claims. (Cl. 60—35.6)

This invention relates generally to aerial missiles, and more specifically to concentric air intakes for aerial missiles of the ramjet type.

Present supersonic ramjet inlets fall into two categories, namely inlets with internal compression, and inlets with external compression. The first type generally consists of either a diverging or converging-diverging channel in which the unavoidable discontinuous transition from supersonic to subsonic flow occurs at the entrance or at some location within the duct. The second type, on the other hand, usually comprises one or more conical surfaces ahead of the inlet for producing external compression in order to cause a considerable reduction in the supersonic velocity at the inlet, and, hence, a considerable overall improvement in the pressure recovery. Designs of the first type become inefficient at high supersonic speeds, whereas those of the second type can be designed to operate efficiently at any given supersonic speed, but this latter design leads to poor performance at speeds which are considerably lower than the design value.

An object of this invention, therefore, is to provide a ramjet inlet which will have good performance characteristics over a wider range of speeds than is possible with either of the two conventional inlet types described above.

Another object of the invention is to provide a ramjet intake which will permit the attainment of high thrust at supersonic speeds which are considerably lower than the design flight speed, thus permitting satisfactory self-acceleration, and, consequently, greatly decreased booster requirements.

Still even another object of this invention is to provide a supersonic ramjet intake which is economical to manufacture and which is efficient and reliable in operation.

Figure 1:
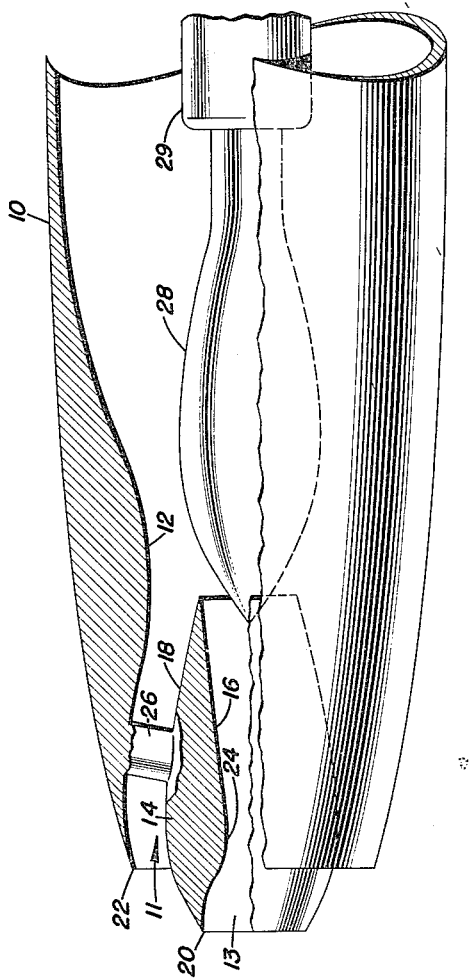
Figure 2:
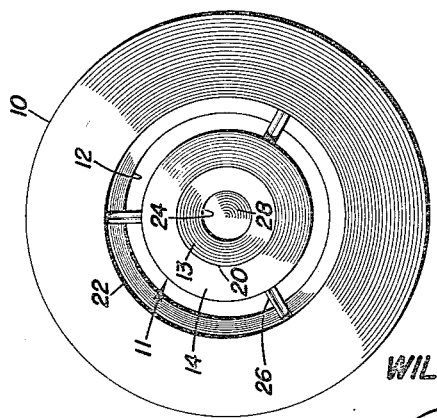

Other objects and many of the attendant advantages of this invention will be appreciated readily as the same becomes understood by reference to the following detailed description, when considered in connection with the accompanying drawings, and in which:

FIG. 1 is a diagrammatic elevation, partially in axial section, through the forward end of an aerial missile of the ramjet type embodying the invention; and FIG. 2 is a front view of the aerial missile illustrated in FIG. 1.

In accordance with the invention, a supersonic aerial missile of the ramjet type is provided with an air intake comprising an outer casing of substantially cylindrical shape having a throat near the forward open end thereof, and a short open-ended duct disposed coaxially with the casing immediately forward of the throat. This duct protrudes slightly forward of the open end of the casing and has an internal constriction. A movable solid ellipsoidal member is disposed coaxially within the casing immediately to the rear of the duct. By means of this arrangement, the protruding center duct and the movable member together act as a valve for the center duct.

Referring now to the drawings, there is shown in FIG. 1 the forward intake end 10 of an aerial missile of the ramjet type having a duct 11 formed with a throat or constriction 12.

A second intake duct 13 comprising a substantially tubular member 14 is located coaxially with respect to duct 11 and the forward intake end 10 of the aerial missile. Member 14 has both its inner and outer surfaces 16 and 18 configured to produce the desired location and nature of shock wave. This member 14 is located forward of constriction 12, and its forward edge 20 is located in advance of the forward edge 22 of the forward intake end 10.

Member 14 also has a throat or constriction 24, defining the central inlet duct of the ramjet. Strut members 26 may be provided to hold the inner tubular member 14 in place.

In addition to the above, an additional member 28 may be used. Member 28 is generally solid and ellipsoidal in shape, though not limited thereto, and is disposed coaxially within the forward end 10 of the ramjet missile and immediately to the rear of member 14. Member 28 thus acts as a valve for the duct 13 in tubular member 14, and it may constitute or house the warhead of the aerial missile.

Member 28 may be mounted adjustably at 29, so as to be shiftable along the axis of the ramjet, to find the best position. It may be desirable to provide a fixed location for member 28, although in some cases the provision of automatic means for shifting the member 28 during the transition from the condition of self-sustained flight at low speed, to high speed of the ramjet may be found necessary to ensure maximum efficiency.

The amount of protrusion of the forward end of member 14 will depend upon the designed supersonic speed of the ramjet aerial missile. This protrusion will increase with the design Mach number, preferably in such a way that the shock wave originating at edge 20 will just touch edge 22 also.

The air intake passes through the two concentric ducts 11 and 13. Duct 13 is a conventional convergent-divergent channel, and is designed to permit swallowing of the normal shock at or slightly below the Mach number at which separation of the launching booster occurs. Duct 13 provides compression through one or more oblique waves and one normal shock wave. The oblique shock wave originates at the lip 20 of the inner duct 13, and, hence, the outer surface of this duct 13 serves the usual function of the spike on the Oswatitsch design. The center body 28 may or may not be provided as previously pointed out. If it is provided, however, it is intended that it house the warhead, and it is also intended that it be movable along the longitudinal center line. Hence, it will act as a valve to control the shock position or mass flow in duct 13.

The inlet arrangement described above offers several advantages over conventional designs. Ducts 11 and 13 can be designed to provide high thrust throughout the flight Mach number range, and, hence, will have good acceleration characteristics, thereby substantially reducing the booster requirements. Duct 11 provides considerable advantage at the higher Mach numbers, that is, for Mach numbers greater than two (2) and can be designed to give maximum thrust at the maximum flight Mach number. Duct 13 is designed to give maximum recovery at the separation Mach number.

In addition to the above, the combination of ducts 11 and 13 provides a means for keeping relatively high thrust over the entire Mach number range, and the off-design characteristics of duct 11 are improved since the mass flow entering duct 13 does not contribute to the sub-sonic spillover as is the case with a solid center body.

This arrangement affords considerable design advantages since the relative areas as well as the inner and outer contours of ducts 11 and 13 can be chosen to fit a specific requirement; furthermore, the movable center body 28 will provide a finer control of the operation of the entire unit by regulating the shock position in duct 13.

Obviously many modifications and variations of the present invention are possible in the light of the above teachings. It is therefore to be understood that within the scope of the appended claims the invention may be practiced otherwise than as specifically described.

What is claimed is:

1. In combination with an aerial missile of the ramjet type, having an open-ended duct extending therethrough in the longitudinal direction for the passage of an airstream through said missile, a supersonic air intake arrangement therefor, including a first constriction near the forward end of said duct, means disposed within said duct and located immediately forward of said first constriction and protruding forward of the open end of said duct, said means having an opening with an internal constriction therein, and adjustable means disposed coaxially within said duct and located to cooperate with said first mentioned means so as to act as a valve therefor.

2. In combination with an aerial missile of the ramjet type having an open-ended duct extending in the longitudinal direction of said missile for the passage of an airstream therethrough, a supersonic air intake arrangement therefor, including a first constriction near the forward end of said duct, ducting means disposed within said open-ended duct and located immediately forward of said first constriction and protruding forward of the open end of said duct, said ducting means having an internal constriction therein, and adjustable ellipsoidal means disposed coaxially within said duct and located to cooperate with said ducting means so as to act as a valve therefor.

3. A supersonic air intake arrangement, comprising, an outer casing defining an open-ended duct extending through the casing in the longitudinal direction thereof for the passage of an airstream therethrough, said duct having a first constriction thereon, means disposed within said duct and located immediately forward of said first constriction, said means having an opening with an internal constriction thereon, and an adjustable means disposed coaxially within said duct and located to cooperate with said first mentioned means so as to act as a valve therefor.

4. A supersonic air intake arrangement, comprising, an outer casing defining an open-ended duct extending in the longitudinal direction of said casing for the passage of an airstream therethrough, a first constriction in said duct, ducting means disposed within said open-ended duct and located immediately forward of said first constriction and protruding forward through the open end of said duct, said ducting means having an internal constriction means thereon, and an adjustable means disposed coaxially within said duct and located to cooperate with said ducting means so as to act as a valve therefor.

References Cited in the file of this patent
UNITED STATES PATENTS

| | | |
|---|---|---|
| 1,362,997 | Koleroff | Dec. 21, 1920 |
| 2,632,295 | Price | Mar. 24, 1953 |
| 2,633,699 | Goddard | Apr. 7, 1953 |